United States Patent [19]
Kusakabe et al.

[11] 3,717,962
[45] Feb. 27, 1973

[54] MACHINE TOOL WITH TIME CONTROL DEVICE

[75] Inventors: Takeshi Kusakabe; Makoto Kikuchi, both of Kariya; Isao Suzuki, Okazaki, all of Japan

[73] Assignee: Toyoda Koki Kabushiki Kaisha, Kariya-shi, Japan

[22] Filed: July 29, 1971

[21] Appl. No.: 167,117

[30] Foreign Application Priority Data

July 31, 1970 Japan.................................45/67570

[52] U.S. Cl.................................................51/165.91
[51] Int. Cl.................................................B24b 49/04
[58] Field of Search............51/165 R, 165.91, 165.9

[56] References Cited

UNITED STATES PATENTS 3,622,287  11/1971  Kurimoto..........................51/165 R
2,963,832  12/1960  Ohringer..........................51/165.91
2,745,221  5/1956   Comstock.........................51/165.91

*Primary Examiner*—Harold D. Whitehead
*Attorney*—Norman F. Oblon et al.

[57] ABSTRACT

A machine tool for performing a predetermined machining cycle includes a feed means for effecting relative movement between a work support and a tool support. A first timer is timed out after a predetermined time period from the start of a machining cycle for setting a constant machining cycle time. A second timer is timed out after a predetermined time period from the start of a machining cycle for setting at least one check point during a machine cycle. Any difference between the predetermined machining cycle and an actual machining cycle is detected at the check point. The actual machining cycle is then compensated to perform the predetermined machining cycle.

14 Claims, 10 Drawing Figures

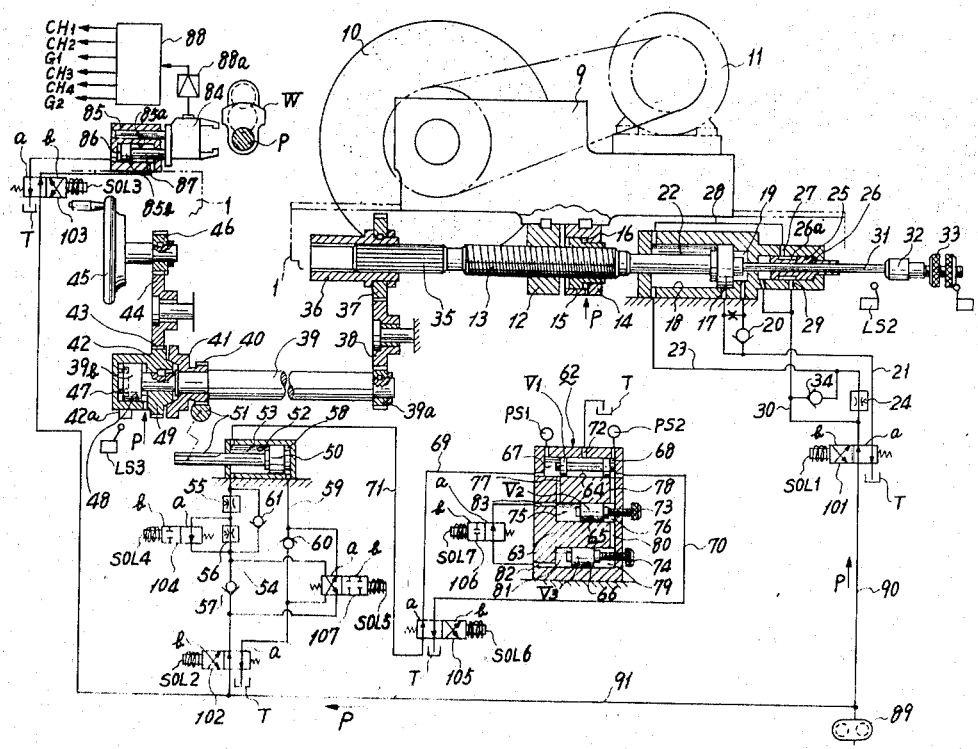

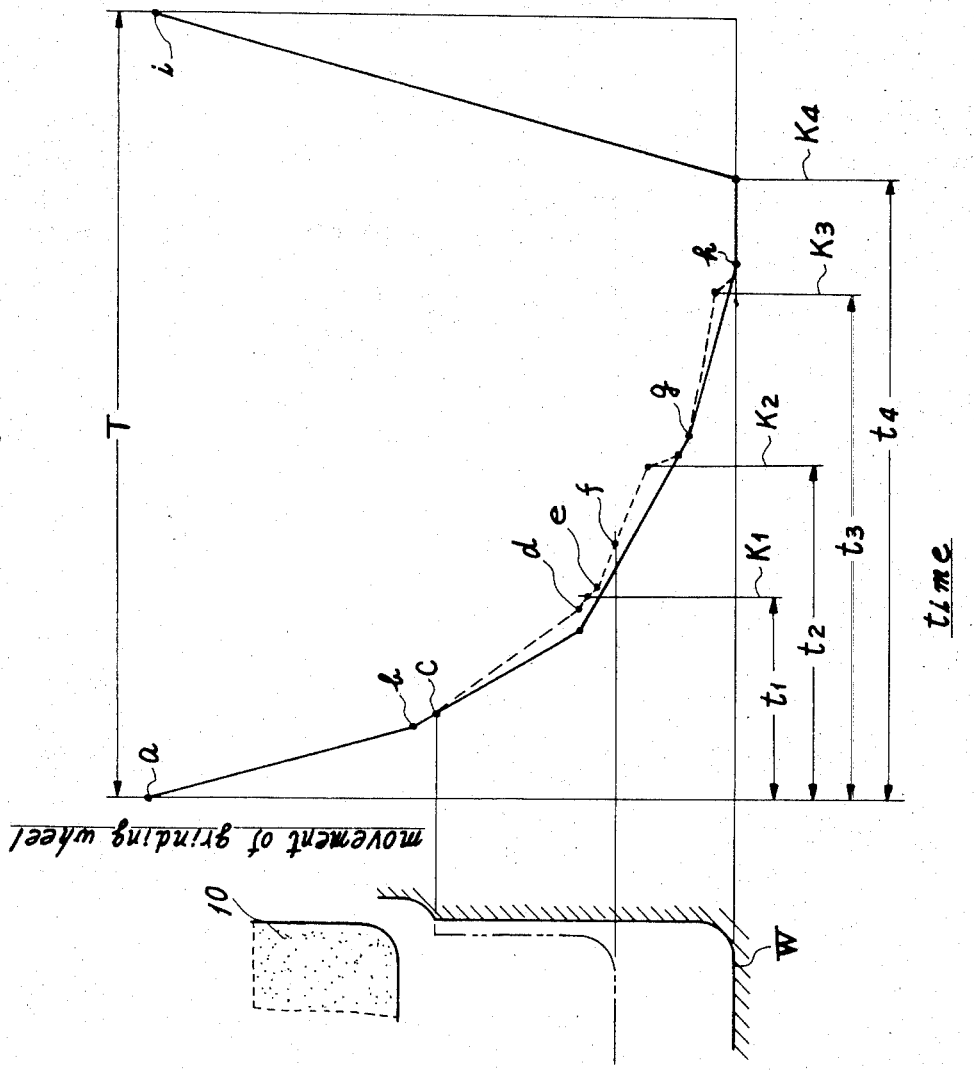

MACHINE TOOL WITH TIME CONTROL DEVICE

BACKGROUND OF THE INVENTION

1. Field of the Invention

The present invention relates to a machine tool provided with a time control device which is extremely useful when applied to a grinding machine.

2. Description Of The Prior Art

In a conventional crankpin grinding machine, as shown in solid line in FIG. 4, a grinding wheel is moved by a cylinder toward a workpiece at a rapid speed, and then the rapid speed is changed to a shoulder grinding speed for grinding the shoulders of a pin portion of the workpiece. The grinding wheel is then moved by another cylinder at a rough grinding speed for enabling a rough grinding of the pin portion of the workpiece. A sizing device is operated during the rough grinding operation to measure the diameter of the pin portion. When the sizing device generates a first sizing signal which corresponds to a predetermined diameter of the pin portion, the rough grinding speed is changed to a fine grinding speed for enabling a fine grinding operation. When the sizing device generates a second sizing signal which corresponds to a predetermined diameter of the pin portion, the movement of the grinding wheel is stopped to enable a spark out operation to be performed for a predetermined time period. After the spark out operation, the grinding wheel is then moved away from the workpiece at the rapid speed, and then, in order to enable a next pin portion of the workpiece to be ground, a succeeding predetermined operation is performed, which includes angular positioning of the chucks, unclamping of the chucks, angular positioning of the workpiece, axial positioning of the workpiece, clamping of the chucks and longitudinal indexing of the table.

The shoulder, rough and fine grinding speeds are set by throttles provided in a hydraulic circuit to enable the cylinders thereof to satisfy an optimum grinding condition.

While somewhat satisfactory, in the prior art conventional crankpin grinding machine, it is rarely the case that the grinding wheel is moved at a preset optimum speed, since viscosity changes in accordance with temperature changes and a lowering of the sharpness of the grinding wheel will affect the feed movement of the grinding wheel, whereby a variation in machining cycle time may often occur. In accordance therewith, while the conventional crankpin grinding machine which was constructed to start a succeeding predetermined operation after the grinding of one pin portion of the workpiece, in response to a sizing signal from the sizing device, could maintain the finished size of the workpiece constant with high accuracy, the same could not maintain the machining cycle time constant, which in turn tended to impede production management.

SUMMARY OF THE INVENTION

It is therefore an object of the present invention to provide a new and improved unique machine tool which is provided with a time control device.

Another object of the present invention is to provide a new and improved unique machine tool which is provided with a time control device such that an actual machining cycle thereof can be compensated to coincide with a predetermined machining cycle.

It is still another object of the subject invention to provide a new and improved unique machine tool which includes a time control device for setting a check point for comparing an actual machining cycle with a predetermined machining cycle and for detecting any difference therebetween.

One other object of the present invention is to provide a new and improved unique machine tool which permits efficient production management.

Briefly, in accordance with the teachings of the present invention, the foregoing and other objects are in one aspect attained by the provision of a machine tool which includes a first timer means which is timed out after a predetermined time period from the start of a machining cycle for setting a constant machining cycle time. A second timer means which is timed out after a predetermined time period from the start of a machining cycle is provided for setting at least one check point during the machining cycle. Detecting means are provided for detecting a difference between the predetermined machining cycle and an actual machining cycle at the check point and further means are provided and responsive to the detecting means for compensating for any difference between the predetermined machinine cycle and the actual machining cycle.

BRIEF DESCRIPTION OF THE DRAWINGS

Other objects, features and attendant advantages of the present invention will be more fully appreciated as the same becomes better understood from the following detailed description when considered in connection with the accompanying drawings, wherein:

FIG. 4 is a grinding cycle diagram of the first preferred embodiment;

FIG. 5 is a diagram showing an output signal for enabling the diameter of a workpiece to be discriminated;

DETAILED DESCRIPTION OF THE INVENTION

Figure 1:
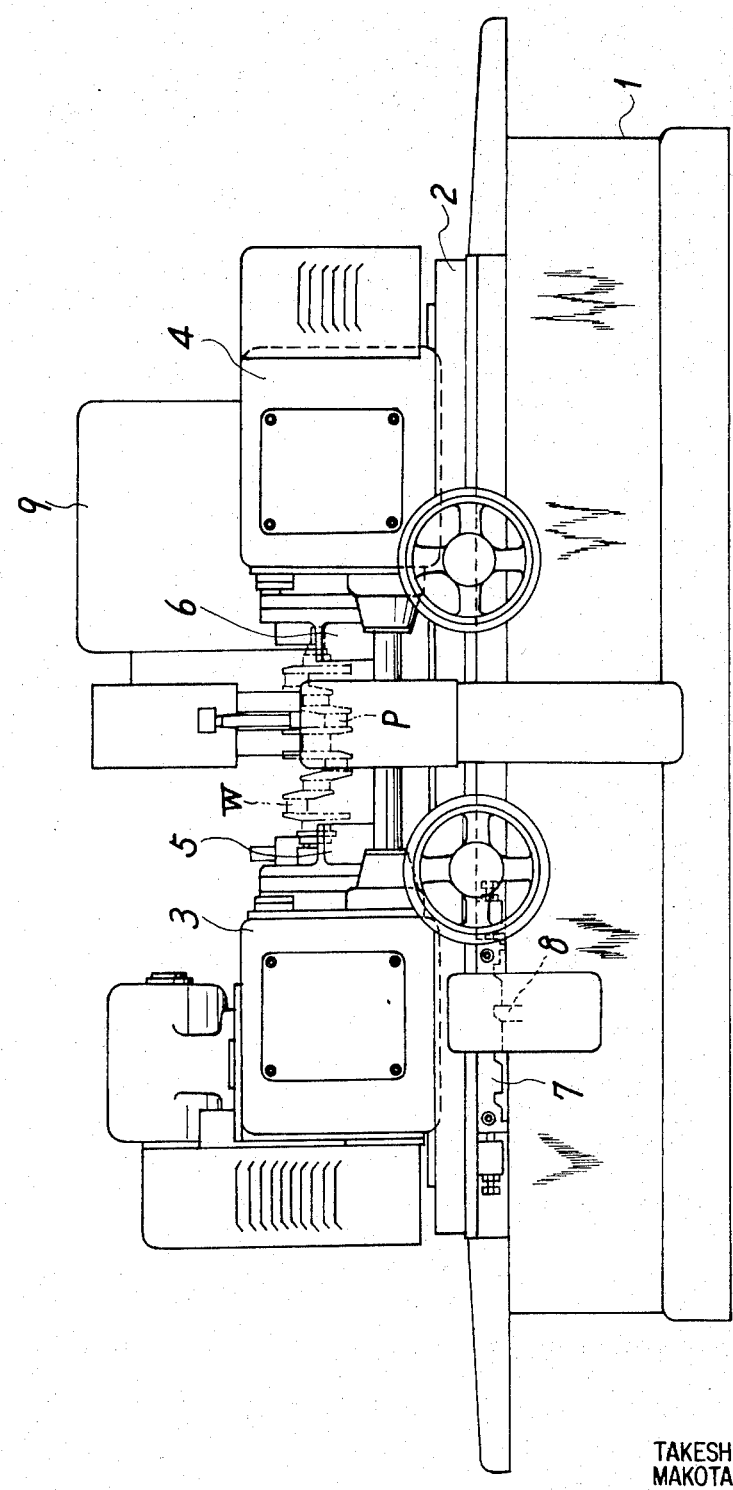
FIG. 1 is a front view of a crankpin grinding machine according to the present invention.

Referring now to the drawings, wherein like reference numerals designate identical, or corresponding parts throughout the several views, and more particularly to FIG. 1 thereof, wherein a machine tool according to the present invention is shown as including a bed 1 on which a table 2 is slidably mounted for a longitudinal movement. Fixedly mounted on the table 2 are opposed head stocks 3 and 4 which rotatably support respective pot chucks 5 and 6, each of which employ respective index devices, not shown, for angularly indexing a workpiece W in the form of a crankshaft about the axis of a journal portion thereof. The workpiece W is clamped at its opposite ends by the pot chucks 5 and 6, and a pin portion P of the workpiece to be finished is rotated about the axes of the chucks. An index plate 7 is secured to the underside of the table 2 and is provided with spaced notches corresponding to pin portions of the workpiece W. A locating pin 8 is arranged to be inserted into one of the notches of the index plate 7 for longitudinally indexing the table in accordance with the pin portion of the workpiece W to be finished.

Figure 2:
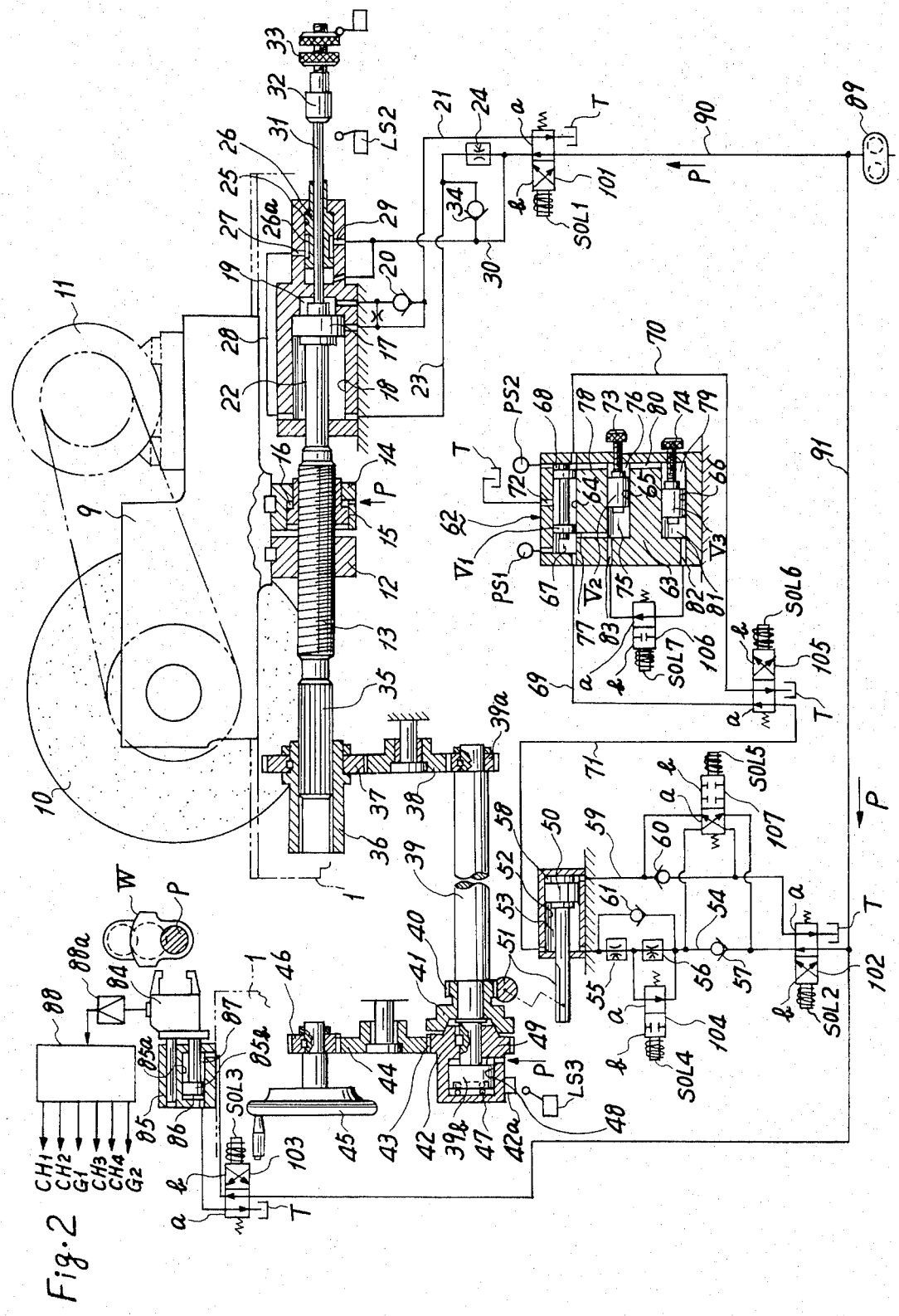
FIG. 2 is a schematic hydraulic circuit diagram of a first preferred embodiment of the present invention.

A wheel support 9 is slidably mounted on the bed 1 for movement transversely to the table 2 and rotatably carries a grinding wheel 10. As shown in the hydraulic circuit diagram of FIG. 2, the grinding wheel 10 is driven by an electric motor 11 which is mounted on the wheel support 9. Referring still to FIG. 2, it is seen that the wheel support 9 is provided at its underside with a feed nut 12 which is threadedly engaged with a feed screw shaft 13. The feed screw shaft 13 is also engaged with a sub-nut 15 which is slidably received in a nut case 14. The nut case 14 is secured to the underside of the wheel support 9. A supply of pressure fluid is inserted into a chamber 16 formed between the nut case 14 and the sub-nut 15 and serves to eliminate any backlash between the feed nut 12 and the feed screw shaft 13. The feed screw shaft 13 has a piston 17 integrally formed at its right end and the same is slidably received in a cylinder 18 for enabling a rapid feed movement of the wheel support 9 and the grinding wheel 10. A right chamber 19 is formed at the right side of the piston 17 and is connected to a change-over valve 101 through a check valve 20 and a conduit 21, while a left chamber 22 is connected thereto through a conduit 23 and a throttle 24. A valve chamber 25 is provided adjacent to the right end of the cylinder 18 and receives a slidable hollow spool valve 26. A port 27 is provided at an intermediate point of the valve chamber 25 and is connected to the left chamber 22 of the cylinder 18 through a conduit 28, while a port 29 is connected to the change-over valve 101 through a conduit 30. A check valve 34 is provided between the conduits 23 and 30. A shaft 31 is connected to the right side of the piston 17 and extends through the spool valve 26 and carries at its right end dogs 32 and 33 which are operatively associated with the right end of the spool valve 26 and a limit switch LS2.

A spline shaft 35 is formed at the left end of the feed screw shaft 13 and is engaged with an internal spline member 36 for enabling an axial sliding movement. A gear 37 is secured on the outer peripheral surface of the spline member 36 and engages a gear 39a which is secured on a right end of a feed shaft 39 through an intermediate gear 38. A clutch member 41 having a gear 40 integrally formed therewith is rotatably mounted on an intermediate portion of the feed shaft 39. Another clutch member 42 having a gear 43 integrally formed therewith is axially slidably keyed on the feed shaft 39. A piston 39b is provided at the left end of the feed shaft 39 and is slidably received in a cylinder 48 formed in the clutch member 42. A spring 47 is interposed into one of the chambers of the cylinder 48 for enabling the engagement between the clutch members 41 and 42 to be released. It should be understood that when a pressurized fluid is introduced into the chamber 49 of the cylinder 48, the clutch member 42 will be held in engagement with the clutch member 41. The gear 43 of the clutch member 42 engages a gear 46 secured on a manual hand wheel 45 through an intermediate gear 44. A dog 42a which is operatively associated with a limit switch LS3 is mounted on the outer peripheral surface of the clutch member 42. The gear 40 of the clutch member 41 engages a rack shaft 51 which is connected to a piston 50. The piston 50 is slidably received in a cylinder 52.

A left chamber 53 of the cylinder 52 is connected to a change-over valve 102 through a pair of throttles 55 and 56 and a check valve 57 which is provided in a conduit 54, while a right chamber 58 of the cylinder 52 is connected thereto through a check valve 60 which is provided in a conduit 59. A check valve 61 is provided in parallel with the throttles 55 and 56 and a change-over valve 104 is provided in parallel with the throttle 56. A bypass conduit which includes a change-over valve 107 is provided between the conduits 54 and 59.

An infeed speed compensating apparatus generally indicated at 62 is further provided and includes a valve body 63, valve chambers 64, 65 and 66 formed in the valve body 63 and spool valves V1, V2, and V3 which are slidably received in the respective valve chambers 64, 65 and 66. Left and right chambers 67 and 68 of the spool valve V1 are connected through respective conduits 69 and 70 to a change-over valve 105 which in turn is connected to the left chamber 53 of the cylinder 54 through a conduit 71. A pressure switch PS1 is connected to the left chamber 67 of the spool valve V1 in order to confirm a rightward movement of the spool valve V1, while a pressure switch PS2 is connected to the right chamber 68 of the spool valve V1 in order to confirm a leftward movement of the spool valve V1. A port 72 is provided at an intermediate portion of the valve chamber 64 and connected to a tank T. The movements of the spool valves V2 and V3 may be adjusted by respective adjusting bolts 73 and 74. It should be understood that the stroke of the spool valve V2 is set to be larger than that of the spool valve V3. Left and right chambers 75 and 76 of the spool valve V2 are connected to the left and right chambers 67 and 68 of the spool valve V1 through respective passages 77 and 78. A left chamber 81 of the spool valve V3 is connected to the left chamber 75 of the spool valve V2 through a passage 82, a change-over valve 106 and a passage 83, while a right chamber 79 thereof is connected to the right chamber 76 of the spool valve V2 through a passage 80.

Mounted on the bed 1 is a bracket 85 having a cylinder 85a therein which slidably receives a piston 85b which is connected to a sizing device 84 for enabling its movement transversely to the table 2. Left and right chambers 86 and 87 of the cylinder 85a are connected to a change-over valve 103. The sizing device 84 has a pair of feelers which are adapted to embrace the pin portion of the workpiece W and the same will generate a signal responsive to the diameter of the pin portion and then be applied to a control device 88 through an amplifier 88a. The control device 88 generates one of a plurality of output signals CH1, CH2, G1, CH3, CH4, and G2 in response to the diameter of the workpiece W, as described hereinafter. A hydraulic pump 89 is connected to the change-over valve 101 through a passage 90 and to the change-over valves 102 and 103 through a conduit 91.

Referring now to FIG. 5, a diagram is therein shown for enabling a discrimination of any time delays of a grinding operation at check points K2 and K3 to be made and for enabling a discrimination of the diameter of a workpiece W. In FIG. 5, the solid line A indicates a change in an output voltage generated by the sizing device 84 in response to a change in the workpiece diameter during a predetermined normal grinding operation. Reference letters $v1$ to $v6$ designate reference voltages set in a conventional Schmitt circuit provided in the control device 88. When the output voltage generated by the sizing device is $v2$ at the check point K2, as in solid line A, the grinding operation is proceeding normally without any time delay and the output signal CH2 is generated from the control device 88. When the output voltage generated by the sizing device is between $v1$ and $v2$ at the check point K2, as in the dotted line A1, the grinding operation is proceeding slightly from normal and a small time delay exists. Under such conditions, the output signal CH1 is generated from the control circuit 88. When the output voltage generated by the sizing device 84 is beyond $v1$ at the check point K2, as in the dotted line A2, the grinding operation is proceeding far away from normal and a very large time delay exists. Under such conditions, the control device 88 will not generate any output signal.

Similarly, when the grinding operation is proceeding normally without any time delay at the check point K3, as in the solid line A, the output signal CH4 is generated from the control device 88. The output signal CH3 is generated, when the grinding operation is not proceeding slightly from normal and a small time delay exists at the check point K3, as in dotted line A3. The control device 88 will not generate any output signal when the grinding operation is proceeding far away from normal and a large time delay exists at the check point K3, as in the dotted line A4. The first and second sizing signals G1 and G2 which respectively correspond to predetermined diameters of the workpiece, are generated from the control device 88 at the respective voltage levels $v3$ and $v6$.

Figure 3:
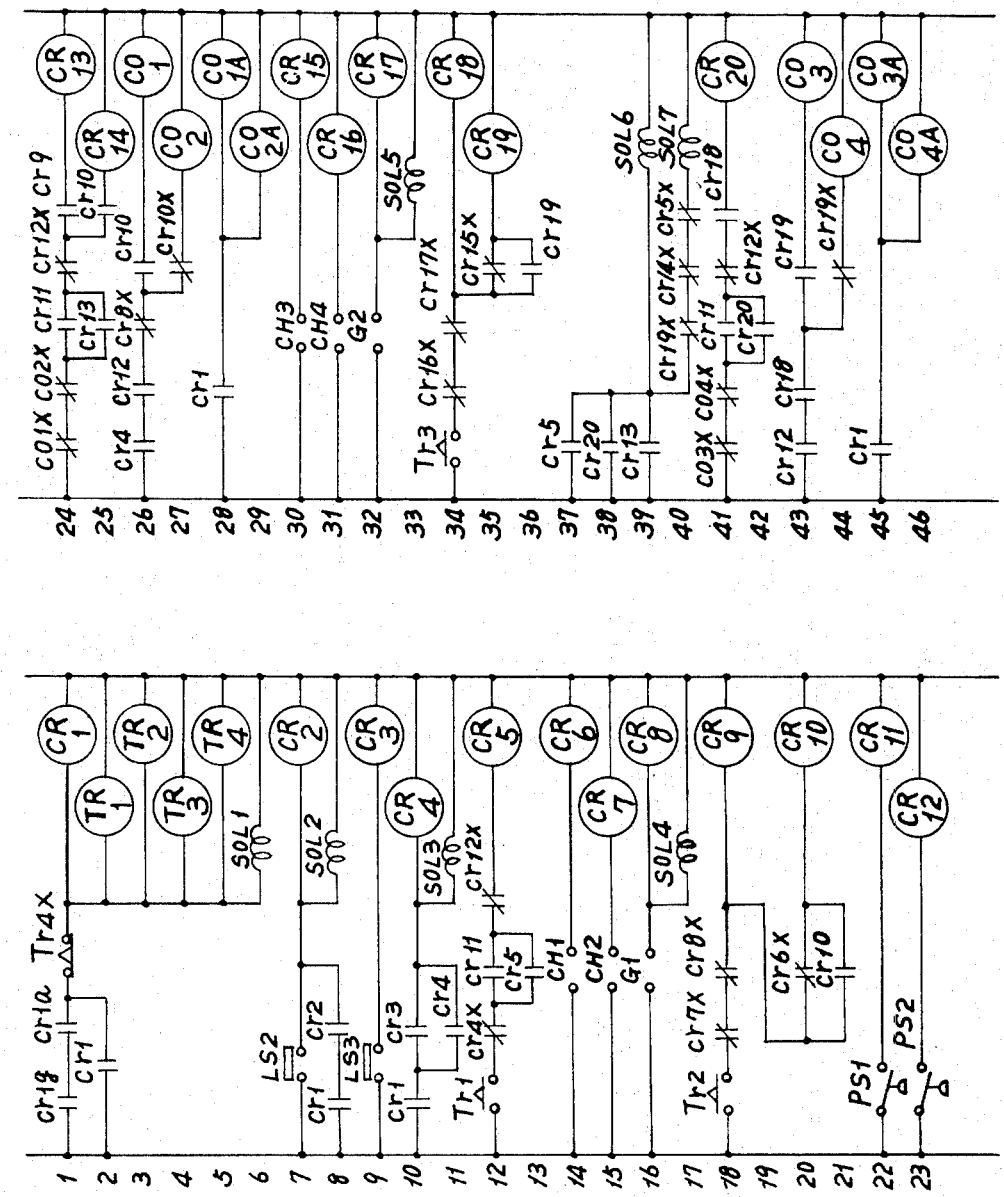
FIG. 3 is an electric circuit diagram of the first preferred embodiment.

The operation of the grinding machine of the first preferred embodiment will now be described with reference to FIGS. 2 to 4. The grinding wheel 10 is shown in its original position in FIG. 2 and is positioned at point $a$ in FIG. 4. When an automatic cycle start button, not shown, is pressed, a contact $cr1g$ in line 1 in FIG. 3 is closed. When the workpiece W is thereafter clamped by the pot chucks 5 and 6, a contact $cr1a$ in line 1 is closed. In accordance therewith, a relay CR1, timers TR1, TR2, TR3 and TR4, and a solenoid SOL1 for the change-over valve 101 are energized by means of the closed contacts $cr1g$ and $cr1a$ and a normally closed contact $Tr4x$ of the timer TR4. The timers TR1, TR2, TR3 and TR4 are timed out at the respective points K1, K2, K3 and K4 after respective predetermined time periods $t1$, $t2$, $t3$ and $t4$ have elapsed, as shown in FIG. 4. Upon energization of relay CR1, a contact $cr1$ thereof in line 2 is closed so that the relay CR1, timers TR1, TR2, TR3 and TR4, and the solenoid SOL1 are held energized. At the same time, relay CO1A in line 28, CO2A in line 29, CO3A in line 45 and CO4A in line 46 for respective counters CO1 in line 26, CO2 in line 27, CO3 in line 43 and CO4 in line 44 are energized through a closed contact $cr1$ in lines 28 and 45 so that the counters CO1, CO2, CO3 and CO4 are held in a countable condition. The counters CO1, CO2, CO3 and CO4 are preset in such a manner that they are counted out when the pressure switch PS2 is respectively energized four, three, two and one times. When the relays CO1A, CO2A, CO3A and CO4A are deenergized, the respective counters CO1, CO2, CO3 and CO4 are reset.

Upon energization of the solenoid SOL1 for the change-over valve 101, the pressurized fluid is supplied into the right chamber 19 of the cylinder 18 through the change-over valve !101, the conduit 21 and the check valve 20, and the fluid in the left chamber 22 is exhausted to the tank T through the conduit 28, the port 27, the annular groove 26a of the spool valve 26, the port 29, the conduit 30 and the change-over valve 101 so that the piston 17 is moved to the left, as viewed in FIG. 2, to thereby rapidly advance the grinding wheel 10 towards the workpiece from the point $a$ to point $b$ in FIG. 4. When the dog 32 which is moved with the piston 17 is brought into contact with the spool valve 26, the spool valve 26 is moved to the left to close the fluid communication between the ports 27 and 29 at the point $b$. The fluid in the left chamber 22 is, therefore, exhausted to the tank T through the conduit 23, the throttle 24 and the change-over valve 101, so that the rapid feed movement of the grinding wheel 10 is changed to a shoulder feed movement for grinding the shoulder portion of the workpiece. At a point $c$ in FIG. 4, the grinding wheel is brought into contact with the shoulder portion to grind the same. When the dog 33 actuates the limit switch LS2 at a point $d$ in FIG. 4, a relay CR2 in line 7 and a solenoid SOL2 in line 8 in FIG. 3 for the change-over valve 102 are energized and at the same time held energized by means of closed contacts $cr1$ and $cr2$ in line 8. Upon energization of the solenoid SOL2, the change-over valve 102 is changed to a position indicated at $b$ so that the pressurized fluid is introduced into the right chamber 58 of the cylinder 52 through the change-over valve 107 and the conduit 59, while the fluid in the left chamber 53 is exhausted to the tank T through the throttle 55 and the change-over valves !104, 107 and 102. The piston 50 of the cylinder 52 is thus moved to the left at a predetermined speed set by the throttle 55 so that the feed shaft 39 is rotated by means of a rack and pinion mechanism 51 and 40. Rotation of the feed shaft 39 is transmitted to the feed screw shaft 13 through the gears 39a, 38 and 37, the spline member 36 and the spline shaft 35 so that the grinding wheel 10 is moved toward the workpiece at a rough grinding speed. The fluid in the left chamber 53 of the cylinder 52 is also introduced into the left chamber 67 of the spool valve V1 through the change-over valve 105 and the conduit 69 so as to move the spool valve V1 into the position shown. The fluid is thereafter introduced into the left chambers 75 and 81 of the respective spool valves V2 and V3 through the passages 77 and 83, the change-over valve 106 and the passage 82 so as to move the spool valves V2 and V3 into the positions shown. Thereafter the pressure in the left chamber 67 of the spool valve V1 is increased in order to actuate the pressure switch PS1. Actuation of the pressure switch PS1 causes a relay CR11 in line 22 in FIG. 3 to energize and thereby to close its contact $cr11$ in line 12. When the limit switch LS3 is actuated by the dog 42a secured to the clutch member 42, before the timer TR1 is timed out at the check point K1, then the grinding operation is normally performed without any time delay, as shown in the solid line in FIG. 4. When the grinding operation is not proceeding normally and a time delay exists, the limit switch LS3 is not actuated at the check point K1 and the timer TR1 is timed out to close its contact $Tr1$ in line 12 in FIG. 3. A relay CR5 in line 12 is therefore energized to close its contact $cr5$ in line 37 to thereby energize a solenoid SOL6 in line 39 for the change-over valve 105. Upon energization of the solenoid SOL6, the change-over valve 105 is changed to a position indicated at $b$, so that the fluid in the left chamber 53 of the cylinder 52 is introduced into the right chamber 68 of the spool valve V1 through the conduit 71, the change-over valve 105 and the conduit 70 to thereby move the spool valve V1 to the left. The fluid is then introduced into the right chambers 76 and 79 of the respective spool valves V2 and V3 through the passages 78 and 80 so as to move the spool valves V2 and V3 to the left. The leftward movement of the spool valves V1, V2 and V3 will cause the fluid in the left chambers 67, 75 and 81 to be exhausted to the tank T through the conduit 69 and the change-over valve 105 so that the speed of the piston 50 of the cylinder 52 in increased to thereby compensate for the time delay. When the pressure in the right chamber 68 of the spool valve V1 is increased to a predetermined value, the pressure switch PS2 is actuated to energize a relay CR12 in line 23 in FIG. 3 to open its normally closed contact $cr12x$ in line 12. In accordance therewith, the relay CR5 in line 12 is deenergized to open its closed contact $cr5$ in line 37 so as to deenergize the solenoid SOL6 in line 39 so that the change-over valve 105 is changed to a position indicated at $a$. Thus, the fluid in the left chamber 53 of the cylinder 52 is again introduced into the left chambers 67, 75 and 81 of the respective spool valves V1, V2 and V3 to thereby actuate the pressure switch PS1. Upon actuation of the pressure switch PS1, the relay CR11 in line 22 is energized to again energize the relay CR5 in line 12 so that the solenoid SOL6 in line 39 is again energized. Therefore the compensation for the time delay is continued until the limit switch LS3 is actuated by the dog 42a at a point $e$ in FIG. 4.

Upon actuation of the limit switch LS3, a relay CR3 in line 9 in FIG. 3 is energized to close its contact $cr3$ in line 10 to thereby energize a relay CR4 in line 10 and a solenoid SOL3 for the change-over valve 103. Upon energization of the relay CR4, its normally closed contact $cr4x$ in line 12 is opened to hold the relay CR5 in line 23 deenergized so that the compensation for the time delay is stopped and the grinding operation is again continued at the rough grinding speed set by the throttle 55. Upon energization of the solenoid SOL3, the change-over valve 103 is changed to a point $b$ so that the sizing device 84 is advanced toward the workpiece to embrace the same.

As shown at a point $f$ in FIG. 4, the grinding wheel is moved into contact with the pin portion of the workpiece at the rough grinding speed and the rough grinding operation is started. Now, when the timer TR2 is timed out at the second check point K2, its contact $Tr2$ in line 18 in FIG. 3 is closed to thereby energize a relay CR9. It should be understood that at the second check point K2, the control device 88 for the sizing device 84 generates an output signal corresponding to the diameter of the pin portion of the workpiece, as described hereinbefore. When the rough grinding operation is proceeding far from normal and a large time delay exists, then the control device 88 will not generate any output signal at the second check point K2, and the relays CR6 in line 14, CR7 in line 15 and CR8 in line 16 in FIG. 4 are not energized so that a relay CR10 in line 20 is energized through a normally closed contact $cr6x$ of relay CR6 to thereby energize relays CR13 in line 24 and CR14 in line 25.

The energization of the relays CR13 and CR14 will cause the solenoid SOL6 in line 39 to be energized and a solenoid SOL7 in line 40 for the change-over valve 106 to be held deenergized. In accordance therewith, the spool valves V1, V2 and V3 are reciprocatingly moved to compensate for the time delay during the rough grinding operation in the same manner as in the compensation at the first check point K1. The number of times of actuation of the pressure switch PS2 is counted by the counter CO1 in line 26. When the pressure switch PS2 is actuated four times, the counter CO1 is counted out to open its normally closed contact $co1x$ in line 24 to thereby deenergize the relay CR13 which in turn will deenergize the solenoid SOL6 so that the compensation by means of the compensating apparatus is stopped.

When the rough grinding operation is not proceeding normally and a small time delay exists, then the control device 88 generates the output signal CH1 at the second check point K2 and the relay CR6 in line 14 is energized to hold the relay CR10 in line 20 deenergized. The energization of the relay CR9 in line 18 through closed contact $Tr2$ causes the relay CR13 in line 24 to be energized so that the solenoids SOL6 and SOL7 are thereby energized. Upon the energization of the solenoid SOL7, the change-over valve 106 is changed to a position $b$ so that only the spool valves V1 and V2 are reciprocatingly moved to compensate for the time delay during the rough grinding operation in the same manner as in the previous case. The number of times of actuation of the pressure switch PS2 is counted by the counter CO2 in line 27. When the pressure switch PS2 is actuated three times, the counter CO2 is counted out to thereby deenergize the relays CR13 and CR14 which in turn deenergizes the solenoids SOL6 and SOL7 so that the compensation for the time delay is stopped.

When the rough grinding operation is proceeding normally without any time delay, then the control device 88 generates the output signal CH2 at the second check point K2, and the relay CR7 is energized so that the relays CR9 and CR10 are not energized. Thus, no compensation for time delay is needed or performed.

When the first sizing signal G1 is generated from the control device 88 at a point $g$ in FIG. 4, the relay CR8 in line 16 and a solenoid SOL4 in line 17 in FIG. 3 for the change-over valve 104 are energized. Upon the energization of the solenoid SOL4, the change-over valve 104 is changed to a position b so that the fluid in the left chamber 53 of the cylinder 52 is exhausted to the tank T through the throttles 55 and 56. The rough grinding speed of the grinding wheel 10 is thus changed to a fine grinding speed for a fine grinding operation. When the timer TR3 is timed out at the third check point K3, its contact Tr3 in line 34 in FIG. 3 is closed. At the third check point K3, the control device 88 for the sizing device 84 generates an output signal corresponding to the diameter of the workpiece, as described hereinbefore. When the fine grinding operation is proceeding far from normal and a large time delay exists, then the control device 88 will not generate any output signal at the third check point K3, and relays CR15 in line 30, CR16 in line 31 and CR17 in line 32 are not energized and relays CR18 in line 34 and CR19 in line 35 are energized to thereby energize a relay CR20 in line 41. The energization of the relay CR20 causes energization of the solenoid SOL6 so that the spool valves V1, V2 and V3 are reciprocatingly moved to compensate for the time delay during the fine grinding operation. The number of times of actuation of the pressure switch PS2 is counted by the counter CO3 in line 43. When the pressure switch PS2 is actuated two times, the counter CO3 is counted out to deenergize the relay CR20 to thereby deenergize the solenoid SOL6 so that the compensation for the time delay is stopped.

When the fine grinding operation is not proceeding normally and a small time delay exists, then the control device 88 generates the output signal CH3 at the third check point K3, and the relay CR15 in line 30 is energized to hold the relay CR19 in line 35 deenergized. The energization of the relay CR18 in line 34 through closed contact Tr3 causes energization of the relay CR20 so that the solenoids SOL6 and SOL7 are energized. Upon the energization of the solenoid SOL7, the change-over valve 106 is changed to the position b so that only the spool valves V1 and V2 are reciprocatingly moved to compensate for the time delay during the fine grinding operation. The number of times of actuation of the pressure switch PS2 is counted by the counter CO4 in line 44. When the pressure switch PS2 is actuated one time, the counter CO4 is counted out to deenergize the relay CR20 to thereby deenergize the solenoids SOL6 and SOL7 so that the compensation for the time delay is stopped.

When the fine grinding operation is proceeding normally and no time delay exists, then the control device 88 generates the output signal CH4 at the third check point K3, and the relay CR16 is energized so that the relays CR18 and CR19 are not energized. Thus, no compensation for time delay is needed or performed.

When the second sizing signal G2 is generated from the control device 88 at a point h in FIG. 4, the relay CR17 in line 32 and a solenoid SOL5 in line 33 for the change-over valve 107 are energized. Upon the energization of the solenoid SOL5, the change-over valve 107 is changed to a position b so that the movement of the grinding wheel 10 is stopped to perform a spark-out operation. When the timer TR4 is timed out at the fourth check point K4, its normally closed contact Tr4x in line 1 in FIG. 3 is opened so that the relay CR1, the timers TR1, TR2, TR3 and TR4, the solenoid SOL1, the relays CR2 and CR4, and the solenoids SOL2 and SOL3 are all deenergized. Therefore, the sizing device 84 is moved away from the workpiece and the grinding wheel is returned back to its original position shown at i in FIG. 4, whereby one grinding cycle of one pin portion of the workpiece is completed at a predetermined time T. The relays CO1A, CO2A, CO3A and CO4A are all deenergized so that the respective counters CO1, CO2, CO3 and CO4 are reset.

Thereafter, in order to grind a next pin portion of the workpiece, a succeeding predetermined operation is continued and includes angular positioning of the chucks, unclamping of the chucks, angular positioning of the workpiece, axial positioning of the workpiece, clamping of the chucks and longitudinal indexing of the table.

Figure 6:
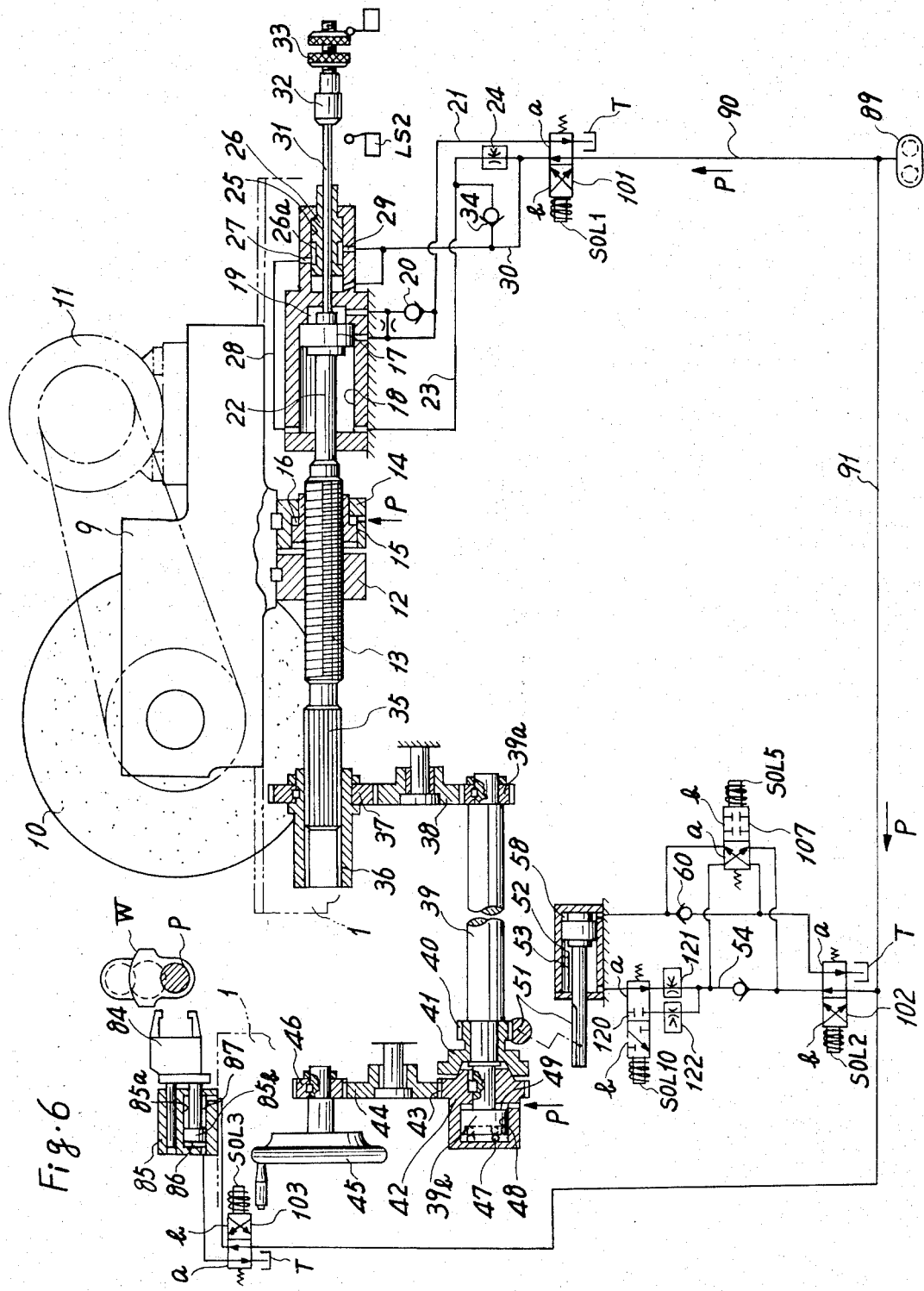
FIG. 6 is a schematic hydraulic circuit diagram of a second preferred embodiment of the present invention.

Referring now to FIG. 6, a hydraulic diagram of a second preferred embodiment of the present invention is therein shown. Since the hydraulic diagram in FIG. 6 is substantially similar to that in FIG. 2, only the different parts thereof will be described. The left chamber 53 of the cylinder 52 is connected to the change-over valve 102 through a change-over valve 120, a first control valve 121 for setting a rough grinding speed, a second control valve 122 for setting a fine grinding speed, and the change-over valve 107. The change-over valve 120 selectively controls the first and second control valves 121 and 122 for rough and fine grinding operations.

Figure 7:
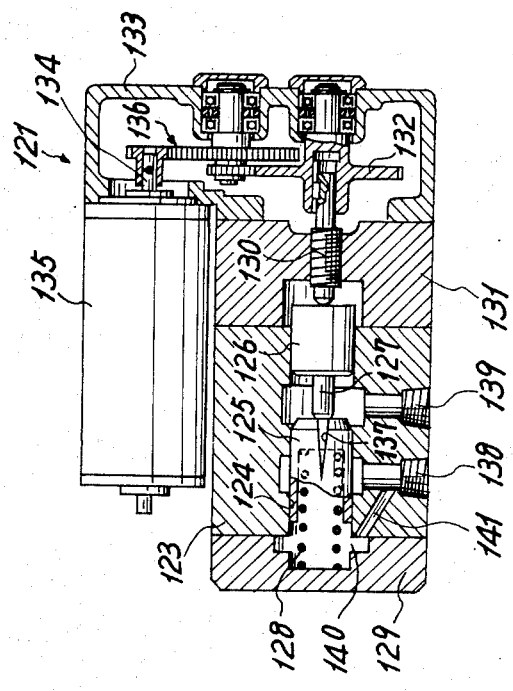
FIG. 7 is a sectional view of a control valve for setting a feed movement of a grinding wheel.
Figure 10:
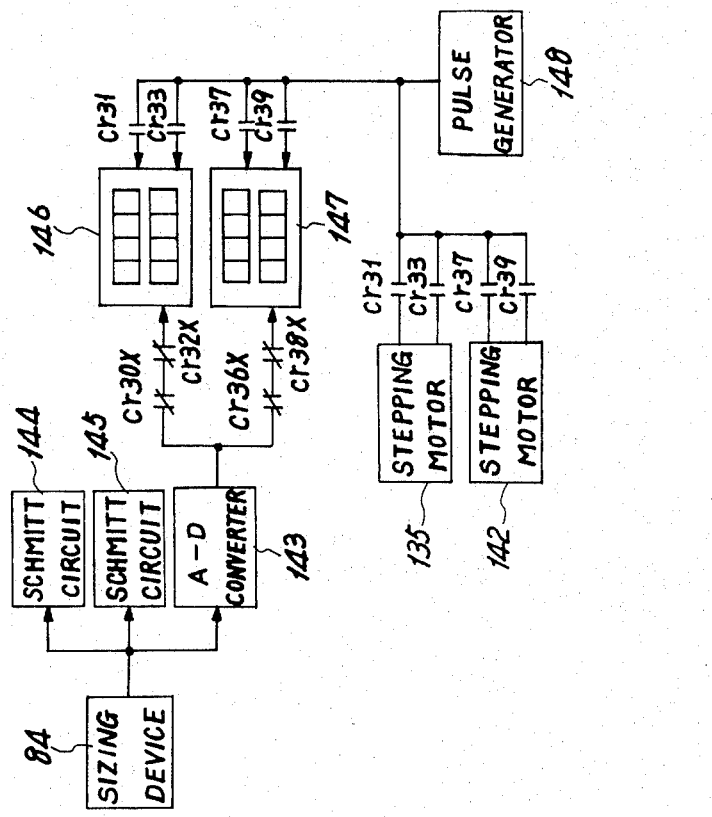
FIG. 10 is a control circuit diagram for controlling a feed movement of the grinding wheel.

Referring now to FIG. 7, it is seen that the first control valve 121 of FIG. 6 includes a valve body 123 having a bore 124 therethrough in which a spool valve 125 and a plunger 126 having a projection 127 are slidably received. A spring 128 is interposed between one end of the spool valve 125 and an end cap 129 secured to one side of the valve body 123 to urge the spool valve 125 toward the projection 127 of the plunger 126. The plunger 126 is held by the spring 128 in engagement with one end of a screw shaft 130 which is threaded in an end cap 131 secured to the other side of the valve body 123. The other end of the screw shaft 130 is keyed for axial movement in a gear 132 which is rotatably mounted in a bracket 133 secured to the end cap 131. The gear 132 is drivingly connected to an output shaft 134 of a stepping motor 135 through gearing indicated at 136. The spool valve 125 has a bevel groove 137 to restrict the fluid communication between ports 138 and 139 provided in the valve body 123. The ports 138 and 139 are respectively connected to the change-over valves 120 and 107. A left chamber 140 of the spool valve 125 is connected to the input port 138 by means of a passage 141. When rotated by the stepping motor 94, the screw shaft 130 is moved axially with the plunger 126 and the spool valve 125. The effective area of the bevel groove 137 of the spool valve 125 is thus adjusted to regulate the flow from the port 138 to the port 139. It should be understood that the bevel groove 137 of the spool valve 125 is normally adjusted in such a manner that the grinding wheel 10 is moved toward the workpiece W at a predetermined rough grinding speed. The fluid from the port 139 urges the spool valve 125 against the spring 128 and is fed to the port 138 without passing through the bevel groove 137.

The second control valve 122 includes a second stepping motor 142 which is constructed in substantially the same manner as the first control valve 121. The bevel groove, not shown, of the second control valve 122, which is more restrictive than the bevel groove 137 of the first control valve 121, is normally adjusted in such a manner that the grinding wheel 10 is moved at a predetermined fine grinding operation.

Figure 8:
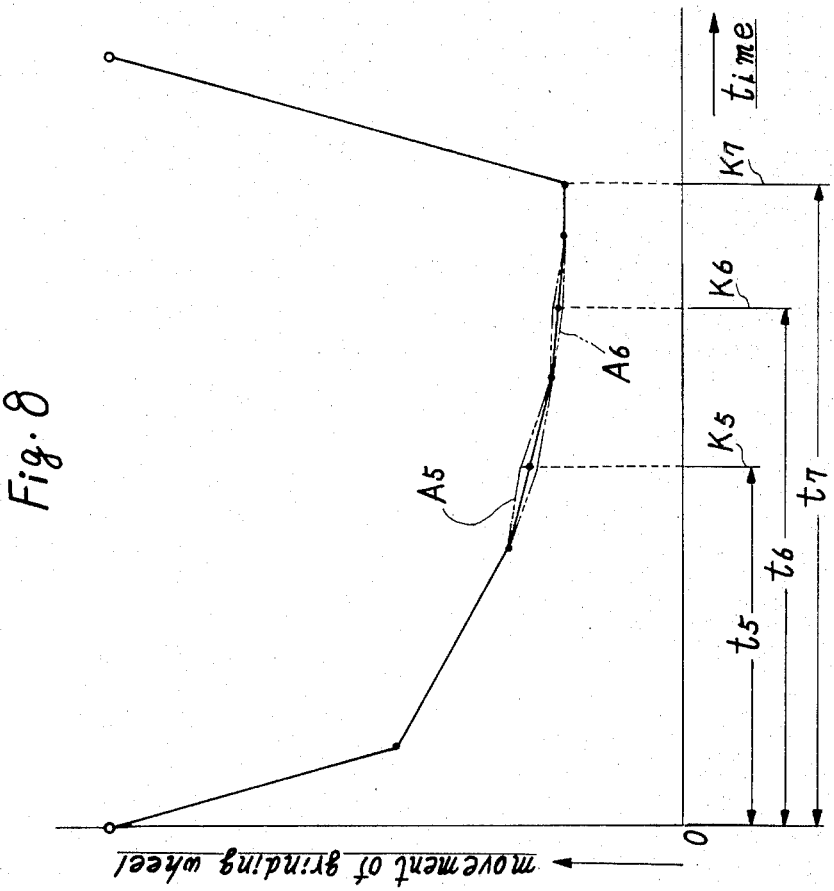
FIG. 8 is a grinding cycle diagram of the second preferred embodiment.
Figure 9:
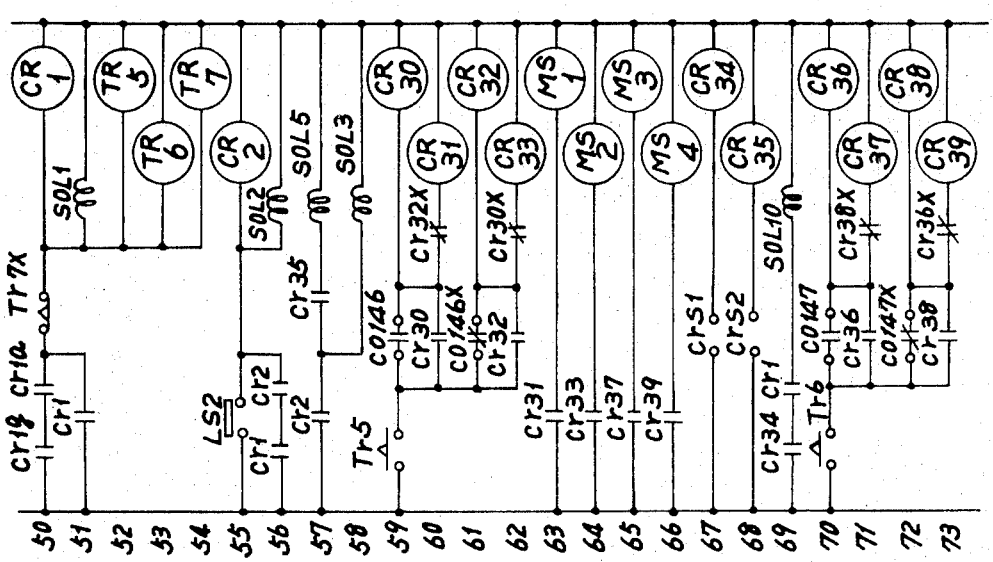
FIG. 9 is an electric circuit diagram of the second preferred embodiment.

The operation of the grinding machine of the second preferred embodiment will now be described with reference to FIGS. 6 to 10. The grinding wheel 10 is shown in its original position FIG. 6. When an automatic cycle start button, not shown, is pressed, a contact cr1g in line 50 in FIG. 9 is closed. When the workpiece W is thereafter clamped by the pot chucks 5 and 6, a contact cr1a is closed. In accordance therewith, a relay CR1, a solenoid SOL1 and timers TR5, TR6 and TR7 are energized by means of closed contacts cr1g and cr1a and a normally closed contact Tr7x of timer TR7. The timers TR5, TR6 and TR7 are timed out at the respective points K5, K6 and K7 after respective predetermined time periods t5, t6 and t7, as shown in FIG. 8. Upon energization of the solenoid SOL1, the piston 17 is moved to the left, as viewed in FIG. 6, to thereby rapidly advance the grinding wheel toward the workpiece. When the dog 32 is brought into contact with the spool valve 26, the rapid feed movement of the grinding wheel 10 is changed to a shoulder feed movement for grinding the shoulder portion of the workpiece. When the dog 33 actuates the limit switch LS2, a relay CR2 in line 55 and a solenoid SOL2 in line 56 in FIG. 9 are energized. Upon energization of the solenoid SOL2, the pressure fluid from the pump 89 is introduced into the right chamber 58 of the cylinder 52 and the fluid in the left chamber 53 is exhausted to the tank T through the first control valve 121, so that the grinding wheel 10 is fed at the rough grinding speed set by the bevel groove 137.

Upon energization of the relay CR2, a solenoid SOL3 in line 58 is energized so that the sizing device 84 is advanced toward the workpiece to embrace the same. The sizing device generates an output signal responsive to the diameter of the workpiece and the same is applied to an analog-digital converter 143 and Schmitt circuits 144 and 145, each of which operates at a different voltage level. A digital signal which is provided by the A–D converter 143 is applied to first and second counters 146 and 147.

A predetermined digital value which corresponds to an optimum output signal from the sizing device 84 at the point K5 without any time delay, is preset in the first counter 146. In accordance therewith, when the grinding wheel 10 is fed at a slower speed than predetermined and thereby with a time delay, the digital signal from the sizing device 84, which is applied through the A-D converter 143, is smaller than the predetermined value preset in the first counter 146. On the other hand, when the grinding wheel 10 is fed at a faster speed than predetermined, the digital signal from the sizing device 84, which is applied through the A–D converter 143, is larger than the predetermined value preset in the first counter 146.

A predetermined digital value which corresponds to an optimum output signal from the sizing device 84 at the point K6, is preset in the second counter 147. The first and second counters 146 and 147 are counted out when a digital output signal from the sizing device 84 becomes equal to or larger than their predetermined preset values.

When the grinding wheel 10 is fed at a slower rough grinding speed than predetermined and thereby with a time delay, as shown in dotted line A5 in FIG. 8, the timer TR5 is timed out at the point K5 before the first counter 146 is counted out. In accordance therewith, a relay CR32 in line 61 in FIG. 9 is energized to energize a relay CR33 in line 62. Upon energization of the relay CR32, the output signal from the sizing device 84 will no longer be applied to the first counter 146 so that the first counter 146 will stop and store the output signal from the sizing device 84 at the point K5. Any difference between the predetermined preset value and the output signal from the sizing device 84 at the point K5 will indicate the extent of any time delay. Upon energization of the relay CR33, a relay MS2 in line 64 is energized for rotating the first stepping motor 135. In accordance therewith, pulses generated from a pulse generator 148 are applied to the first stepping motor 135 to rotate the same in one direction and at the same time to the first counter 146 for adding the same to the value of the output signal from the sizing device 84. The rotation of the first stepping motor 135 in one direction causes the screw shaft 130, the plunger 126 and the spool valve 125, as viewed in FIG. 7, to move to the left against the spring 128 and to thereby increase the effective area of the bevel groove 137. The fluid exhausted from the left chamber 53 of the cylinder 52 is thus increased to raise the rough grinding speed of the grinding wheel 10. When the value of the output signal from the sizing device 84 when added with the pulses from the pulse generator 148 agrees with the predetermined preset value, the first counter 146 is counted out to close its contact co146 in line 59 to thereby energize a relay CR30. Energization of the relay CR30 causes its normally closed contact cr30x in line 62 to open so as to deenergize the relay CR33. In accordance therewith, the application of pulses from the pulse generator 148 to the first stepping motor 135 and the first counter 146 is stopped.

During the continuation of the rough grinding operation, when an output signal from the sizing device 84 reaches a predetermined value, the first Schmitt circuit 144 is actuated to close a contact crs1 in line 67 to energize a relay CR34. Energization of the relay CR34 causes its contact cr34 in line 69 to close to energize a solenoid SOL10. Upon energization of the solenoid SOL10, the fluid in the left chamber 53 of the cylinder 52 is exhausted to the tank T through the second control valve 122, so that the grinding wheel 10 is fed at the fine grinding speed set by the bevel groove, not shown, of the second control valve 122.

When the grinding wheel 10 is fed at a faster fine grinding speed than predetermined, as shown in dotted line A6 in FIG. 8, an output signal is applied from the sizing device 84 to the second counter 147 and the same will thereby reach the predetermined value preset in the second counter 147 and thus the second counter 147 is counted out before the timer TR6 is timed out at the point K6. When the second counter 147 is counted out, its contact co147 in line 70 closes and its normally closed contact co147x in line 72 opens. When the timer TR6 is thereafter timed out at the point K6, its contact Tr6 in line 70 is closed to energize a relay CR36. Energization of the relay CR36 causes its contact cr36 in line 71 to close so as to energize a relay CR37 and its normally closed contact cr36x to open so that the application of an output signal from the sizing device 84 to the second counter 147 is stopped. Thus, the second counter 147 stores the output signal from the sizing device 84 at the point K6. Upon energization of the relay CR37, a relay MS3 in line 65 is energized for rotating the second stepping motor 142 in a reverse direction. In accordance therewith, the pulses generated from the pulse generator 148 are applied to the second stepping motor 142 to thereby rotate the same in the reverse direction and at the same time are applied to the second counter 147 to subtract the value of the output signal from the sizing device 84. The rotation of the second stepping motor 142 in the reverse direction operates to decrease the effective area of the bevel groove, not shown, of the second control valve 122. The fluid exhausted from the left chamber 53 of the cylinder 52 is thus decreased to reduce the fine grinding speed of the grinding wheel 10. When the value of the output signal from the sizing device 84, which is subtracted by the pulses from the pulse generator 148, becomes below the predetermined value preset in the second counter 147, the second counter 147 will not be counted out to close its contact co147x in line 72 to energize a relay CR38. Energization of the relay CR38 causes its contact cr38x in line 71 to open so as to deenergize the relay CR37. In accordance therewith, the application of the pulses from the pulse generator 148 to the second stepping motor 142 and the second counter 147 is stopped.

During the continuation of the fine grinding operation, when an output signal from the sizing device 84 reaches a predetermined value, the second Schmitt circuit 145 is actuated to thereby close a contact crs2 in line 68 to energize a relay CR35. Energization of the relay CR35 causes its contact cr35 in line 57 to close to energize a solenoid SOL5. Upon energization of the solenoid SOL5, the movement of the grinding wheel 10 is stopped to perform a spark-out operation.

When the timer TR7 is timed out at the point K7, its contact Tr7x in line 50 is opened so that the relay CR1, the solenoid SOL1, the timers TR5, TR6 and TR7, the solenoids SOL2, SOL5, SOL3, and SOL10 are all deenergized. In accordance therewith, the sizing device 84 is moved away from the workpiece and the grinding wheel is returned back to its original position, whereby one grinding cycle of one pin portion of the workpiece is completed. Thereafter, a succeeding predetermined operation is continued for enabling the grinding of a next pin portion of the workpiece.

While the invention has been described by means of specific embodiments, it should be understood that the novel and unobvious characteristics thereof may be incorporated into other structural forms without departing from the spirit and scope of the invention as defined in the following claims.

What is claimed as new and desired to be secured by Letters Patent of the United States is:

1. A machine tool for performing a predetermined machining cycle comprising:
   a work support for supporting a workpiece;
   a tool support for supporting a tool;
   feed means for effecting relative movement between said work support and said tool support;
   first timer means timed out after a predetermined time period from the start of a machining cycle for setting a constant machining cycle time;
   second timer means timed out after a predetermined time period from the start of a machining cycle for setting at least one check point during a machining cycle;
   detecting means for detecting a difference between a predetermined machining cycle and an actual machining cycle at said check point;
   feed compensating means for compensating for a speed of relative movement between said work support and said tool support; and
   control means responsive to said detecting means to compensate for a difference between said predetermined machining cycle and an actual machining cycle.

2. A machine tool for performing a predetermined machining cycle comprising:
   a work support for supporting a workpiece;
   a tool support for supporting a tool;
   feed means including a hydraulic cylinder for effecting relative movement between said work support and said tool support;
   first timer means timed out after a predetermined time period from the start of a machining cycle for setting a constant machining cycle time;
   second timer means timed out after a predetermined time period from the start of a machining cycle for setting at least one check point during a machining cycle;
   switch means adapted to be actuated at said check point when an actual machining is occurring at a predetermined machining cycle;
   control means operable for exhausting fluid from one side of said cylinder to change the speed of relative movement between said work support and said tool support upon actuation of said second timer means and non-actuation of said switch means at said check point, said control means being made inoperative upon actuation of said switch means.

3. A machine tool for performing a predetermined machining cycle comprising:
   a work support for supporting a workpiece;
   a tool support for supporting a tool;
   feed means including a hydraulic cylinder for effecting relative movement between said work support and said tool support;
   valve means including spool valve means slidably received therein;
   first switch means energized upon movement of said spool valve means in one direction;
   second switch means energized upon movement of said spool valve means in an opposite direction;
   change-over means to establish, when energized, a fluid communication between one side of said cylinder and one side of said spool valve means and between the other side of said spool valve means and a tank to move said spool valve means in said one direction, and to establish, when energized, a fluid communication between one side of said cylinder and the other side of said spool valve means and between said one side of said spool valve means and said tank to move said spool valve means in the opposite direction;

first timer means timed out after a predetermined time period from the start of a machining cycle for setting a constant machining cycle time;

second timer means timed out after a predetermined time period from the start of a machining cycle for setting at least one check point during a machining cycle;

third switch means adapted to be actuated at said check point when an actual machining is occurring at a predetermined machining cycle; and, relay means for energizing said change-over means upon actuation of said second timer means and the non-actuation of said third switch means at said check point, said first switch means being energized upon movement of said spool valve means in said one direction for deenergizing said relay means to deenergize said change-over means to move said spool valve means in said opposite direction, said second switch means being energized upon movement of said spool valve means in said opposite direction for energizing said relay means to energize said change-over means to move said spool valve means in said one direction, and wherein said relay means is held deenergized upon actuation of said third switch means.

4. A machine tool for performing a predetermined machining cycle comprising:

a work support for supporting a workpiece;

a tool support for supporting a tool;

feed means including a hydraulic cylinder for effecting relative movement between said work support and said tool support;

a sizing device adapted to be engaged with a workpiece to generate a signal responsive to the diameter thereof;

first timer means timed out after a predetermined time period from the start of a machining cycle for setting a constant machining cycle time;

second timer means timed out after a predetermined time period from the start of a machining cycle for setting at least one check point during a machining cycle;

control means operable in response to a signal from said sizing device at said check point for exhausting fluid from one side of said cylinder to change the speed of relative movement between said work support and said tool support; and, means for rendering said control means inoperative when a predetermined amount of fluid is exhausted from said one side of said cylinder by means of said control means.

5. A machine tool for performing a predetermined machining cycle as set forth in claim 4, wherein said tool support is movable towards and away from said work support, said tool support being retracted away from said work support for a succeeding machining operation when said first timer means is timed out.

6. A machine tool for performing a predetermined machining cycle including rough and fine machining operations comprising:

a work support for supporting a workpiece;

a tool support for supporting a tool;

feed means including a hydraulic cylinder for effecting relative movement between said work support and said tool support;

a sizing device adapted to be engaged with a workpiece to generate a signal responsive to the diameter thereof;

first timer means timed out after a predetermined time period from the start of a machining cycle for setting a constant machining cycle time;

second timer means timed out after a predetermined time period from the start of a machining cycle for setting a first check point during a rough machining operation;

third timer means timed out after a predetermined time period from the start of a machining cycle for setting a second check point during a fine machining operation;

control means operable in response to a signal from said sizing devices at each of said check points for exhausting fluid from one side of said cylinder to change the speed of relative movement between said work support and said tool support; and, means for rendering said control means inoperative when a predetermined amount of fluid is exhausted from said one side of said cylinder by means of said control means.

7. A machine tool for performing a predetermined machining cycle comprising:

a work support for supporting a workpiece;

a tool support for supporting a tool;

feed means including a hydraulic cylinder for effecting relative movement between said work support and said tool support;

a sizing device adapted to be engaged with a workpiece to generate a signal responsive to the diameter thereof;

valve means including spool valve means slidably received therein;

first switch means energized upon movement of said spool valve means in one direction;

second switch means energized upon movement of said spool valve means in an opposite direction;

change-over means to establish, when energized, a fluid communication between one side of said cylinder and one side of said spool valve means and between the other side of said spool valve means and a tank to move said spool valve means in said one direction, and to establish, when deenergized, a fluid communication between one side of said cylinder and the other side of said spool valve means and between said one side of said spool valve means and said tank to move said spool valve means in an opposite direction;

first timer means timed out after a predetermined time period from the start of a machining cycle for setting a constant machining cycle time;

second timer means timed out after a predetermined time period from the start of a machining cycle for setting at least one check point during a machinine cycle;

relay means for energizing said change-over means in response to a signal generated from said sizing device at said check point, said first switch means being energized upon movement of said spool valve means in said one direction for deenergizing said relay means to deenergize said change-over means to move said spool valve means in said opposite direction, said second switch means being energized upon movement of said spool valve means in said opposite direction for energizing said relay means to energize said change-over means to move said spool valve means in said one direction; and, counter means for holding said relay means deenergized after said first switch means is actuated a predetermined number of times.

8. A machine tool for performing a predetermined machining cycle as set forth in claim 7, wherein said relay means comprises first and second relays adapted to be selectively energized in response to a signal from said sizing device at said check point and wherein said counter means comprises first and second counters for holding said first and second relays respectively deenergized after said first switch means is actuated a predetermined different number of times.

9. A machine tool for performing a predetermined machining cycle as set forth in claim 8, wherein said spool valve means comprises first and second spool valves slidably received in said valve means, one side of said first spool valve being fluid communicated with one side of said second spool valve through a second change-over means and with said first change-over means, the other side of said first spool valve being fluid communicated with the other side of said second spool valve and said first change-over means, and said second change-over means being selectively actuated in response to a signal from said sizing device to shut off fluid communication between said one sides of said first and second spool valves.

10. A machine tool for performing a predetermined machining cycle as set forth in claim 9, wherein adjusting means is provided for adjusting movements of said first and second spool valves in said opposite direction.

11. A machine tool for performing a predetermined machining cycle comprising:
   a work support for supporting a workpiece;
   a tool support for supporting a tool;
   feed means including a hydraulic cylinder for effecting relative movement between said work support and said tool support;
   valve means for setting the speed of relative movement between said work support and said tool support;
   a sizing device adapted to be engaged with a workpiece to generate a signal responsive to the diameter thereof;
   first timer means timed out after a predetermined time period from the start of a machining cycle for setting a constant machining cycle time;
   second timer means timed out after a predetermined time period from the start of a machining cycle for setting at least one check point during a machining cycle;
   detecting means for detecting a difference between a signal from said sizing device and a preselected signal at said check point; and,
   means responsive to a detected difference by said detecting means for regulating said valve means to change the speed of relative movement between said work support and said tool support.

12. A machine tool for performing a predetermined machining cycle as set forth in claim 11, wherein said tool support is movable towards and away from said work support, said tool support being retracted away from said work support for a succeeding machining operation when said first timer means is timed out.

13. A machine tool for performing a predetermined machining cycle including rough and fine machining operations comprising:
   a work support for supporting a workpiece;
   a tool support for supporting a tool;
   feed means including a hydraulic cylinder for effecting relative movement between said work support and said tool support;
   first valve means for setting a rough machining speed of relative movement between said work support and said tool support;
   second valve means for setting a fine machining speed of relative movement between said work support and said tool support;
   a sizing device adapted to be engaged with a workpiece to generate a signal responsive to the diameter thereof;
   first timer means timed out after a predetermined time period from the start of a machining cycle for setting a constant machining cycle time;
   second timer means timed out after a predetermined time period from the start of a machining cycle for setting a first check point during a rough machining operation;
   third timer means timed out after a predetermined time period from the start of a machining cycle for setting a second check point during a fine machining operation;
   detecting means for detecting a difference between a signal from said sizing device and a preselected signal at each of said check points; and,
   means responsive to a detected difference by said detecting means for regulating said first and second valve means to change the speed of relative movement between said work support and said tool support.

14. A machine tool for performing a predetermined machining cycle comprising:
   a work support for supporting a workpiece;
   a tool support for supporting a tool;
   feed means including a hydraulic cylinder for effecting relative movement between said work support and said tool support;
   valve means including a resiliently urged spool valve slidably mounted therein and provided with a bevel groove for setting the speed of relative movement between said work support and said tool support;
   a stepping motor for shifting, when rotated, said spool valve against a resilient force to change the effective area of said bevel groove to change the speed of relative movement between said work support and said tool support;
   a sizing device adapted to be engaged with a workpiece to generate a signal responsive to the diameter thereof;
   first timer means timed out after a predetermined time period from the start of a machining cycle for setting a constant machining cycle time;
   second timer means timed out after a predetermined time period from the start of a machining cycle for setting at least one check point during a machining cycle;

counter means for detecting a difference between a signal from said sizing device and a preselected value stored therein at said check point; and, means for rotating said stepping motor through an amount corresponding to a detected difference by said counter means.

* * * * *